US012488762B2

(12) United States Patent
Yin et al.

(10) Patent No.: US 12,488,762 B2
(45) Date of Patent: Dec. 2, 2025

(54) IMAGE ADJUSTMENT METHOD, DEVICE, ELECTRONIC DEVICE, AND COMPUTER-READABLE STORAGE MEDIUM

(71) Applicant: SHENZHEN TCL NEW TECHNOLOGY CO., LTD., Guangdong (CN)

(72) Inventors: Debao Yin, Guangdong (CN); Ruituan Zhou, Guangdong (CN)

(73) Assignee: SHENZHEN TCL NEW TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/844,955

(22) PCT Filed: Feb. 14, 2023

(86) PCT No.: PCT/CN2023/075971
§ 371 (c)(1),
(2) Date: Sep. 7, 2024

(87) PCT Pub. No.: WO2023/227014
PCT Pub. Date: Nov. 30, 2023

(65) Prior Publication Data
US 2025/0087171 A1 Mar. 13, 2025

(30) Foreign Application Priority Data
Mar. 7, 2022 (CN) ......................... 202210217561.1

(51) Int. Cl.
*G09G 3/34* (2006.01)

(52) U.S. Cl.
CPC ... *G09G 3/3406* (2013.01); *G09G 2320/0626* (2013.01); *G09G 2330/021* (2013.01)

(58) Field of Classification Search
CPC ........... G09G 3/3406; G09G 2320/064; G09G 2360/16; G09G 3/3426; G09G 2330/021
See application file for complete search history.

(56) References Cited

U.S. PATENT DOCUMENTS 9,542,894 B2 * 1/2017 Ohno ....................... G09G 3/36
2008/0252589 A1 10/2008 Chung et al.
(Continued)

FOREIGN PATENT DOCUMENTS

CN 109256095 A 1/2019
CN 112967687 A 6/2021
(Continued)

OTHER PUBLICATIONS

International Search Report in International application No. PCT/CN2023/075971, mailed on Jul. 14, 2023.
(Continued)

*Primary Examiner* — Van N Chow
(74) *Attorney, Agent, or Firm* — PV IP PC; Wei Te Chung

(57) ABSTRACT

An image adjustment method, a device, an electronic device, and a computer-readable storage medium are provided. A maximum current setting value and an expected current value corresponding to a backlight are acquired. According to the maximum current setting value and the expected current value, an operating current value corresponding to the backlight is determined. According to the operating current value, a maximum overdrive current setting value corresponding to the backlight, and a current brightness array of the backlight corresponding to a current displayed image on a screen, a target brightness array of the backlight is determined. A brightness of the backlight is controlled according to multiple target brightness arrays in the target
(Continued)

brightness array to adjust an image displayed on the screen. A display lifespan of the screen is improved.

20 Claims, 3 Drawing Sheets

(56) References Cited

U.S. PATENT DOCUMENTS

| | | | | |
|---|---|---|---|---|
| 2010/0053222 | A1* | 3/2010 | Kerofsky | G09G 3/3406 345/690 |
| 2014/0106821 | A1 | 4/2014 | Nakahara | |
| 2016/0063927 | A1* | 3/2016 | Li | G09G 3/3406 315/297 |
| 2020/0219464 | A1* | 7/2020 | Callway | G09G 3/3406 |
| 2022/0358871 | A1* | 11/2022 | Hu | G09G 3/2018 |
| 2024/0021137 | A1* | 1/2024 | Hu | G09G 3/3426 |
| 2024/0144890 | A1* | 5/2024 | Wang | G09G 3/3426 |

FOREIGN PATENT DOCUMENTS

| | | | |
|---|---|---|---|
| CN | 113568474 | A | 10/2021 |
| CN | 114038441 | A | 2/2022 |
| CN | 114677975 | A | 6/2022 |
| KR | 20120018001 | A | 2/2012 |

OTHER PUBLICATIONS

Written Opinion of the International Search Authority in International application No. PCT/CN2023/075971, mailed on Jun. 3, 2023.

* cited by examiner

IMAGE ADJUSTMENT METHOD, DEVICE, ELECTRONIC DEVICE, AND COMPUTER-READABLE STORAGE MEDIUM

CROSS REFERENCE TO RELATED APPLICATIONS

This application is a US national phase application based upon an International Application No. PCT/CN2023/075971, filed on Feb. 14, 2023, which claims priority to Chinese Patent Application No. 202210217561.1, filed Mar. 7, 2022 and entitled "IMAGE ADJUSTMENT METHOD, DEVICE, ELECTRONIC DEVICE, AND COMPUTER-READABLE STORAGE MEDIUM". The entire disclosures of the above application are incorporated herein by reference.

TECHNICAL FIELD

This application relates to the field of display technologies, specifically to an image adjustment method, a device, an electronic device, and a computer-readable storage medium.

BACKGROUND TECHNOLOGY

With the development of display technology, users have higher and higher requirements for a display performance of LCD screens. Therefore, LCD screen manufacturers have begun to work hard to improve the display performance of LCD screens. Compared with a traditional global dimming (GD) method, the latest local dimming (LD) method has achieved better results.

However, in actual operation, the local dimming method directly controls a brightness of a backlight according to an expected current value, which easily causes the backlight to work at an excessively high current for a long time, causing hardware damage to a display screen and shortening a lifespan of the display screen.

SUMMARY OF INVENTION

Technical Problem

Currently, there is a problem that a lifespan of a display screen is low.

Technical Solutions

Embodiments of the present application provide an image display method, a device, an electronic device, and a computer-readable storage medium to increase a display lifespan of a screen.

In order to solve the above technical problems, the embodiments of the present application provide the following technical solutions:

In a first aspect, the present application provides an image adjustment method, including:

acquiring a maximum current setting value and an expected current value corresponding to a backlight;

determining an operating current value corresponding to the backlight according to the maximum current setting value and the expected current value;

determining a target brightness array of the backlight according to the operating current value, a maximum overdrive current setting value corresponding to the backlight, and a current brightness array of the backlight corresponding to a current displayed image on a screen, where the target brightness array includes a plurality of target brightness data; and controlling a brightness of the backlight according to the plurality of target brightness data in the target brightness array to adjust an image displayed on the screen.

Alternatively, in some possible implementations of the present application, determining an operating current value corresponding to the backlight according to the maximum current setting value and the expected current value includes:

if the expected current value is less than or equal to the maximum current setting value, determining the expected current value as the operating current value corresponding to the backlight;

if the expected current value is greater than a maximum current value corresponding to the backlight, acquiring an overdrive time during which a current value corresponding to the backlight is continuously greater than the maximum current setting value; and determining the operating current value corresponding to the backlight according to the overdrive time.

Alternatively, in some possible implementations of the present application, determining the operating current value corresponding to the backlight according to the overdrive time includes:

if the overdrive time is equal to a first preset time threshold, determining the maximum current setting value as the operating current value of the backlight;

if the overdrive time is greater than the first preset time threshold, acquiring a second preset time threshold, where the second preset time threshold is greater than the first preset time threshold; determining the operating current value corresponding to the backlight according to the second preset time threshold;

if the overdrive time is less than the first preset time threshold, acquiring a number of times overdrive during which the current value corresponding to the backlight is greater than the maximum current setting value within a preset time period; and determining the operating current value corresponding to the backlight according to the number of times overdrive.

Alternatively, in some possible implementations of the present application, determining the operating current value corresponding to the backlight according to the second preset time threshold includes:

if the overdrive time is greater than or equal to the second preset time threshold, determining the maximum overdrive current setting value as the operating current value corresponding to the backlight; and if the overdrive time is less than the second preset time threshold, determining the maximum current setting value as the operating current value of the backlight.

Alternatively, in some possible implementations of the present application, determining the operating current value corresponding to the backlight according to the number of times overdrive includes:

if the number of times overdrive is greater than or equal to a preset number of times overdrive, determining the maximum current setting value corresponding to the backlight as the operating current value corresponding to the backlight; and if the number of times overdrive is less than the preset number of times overdrive, determining the maximum overdrive current setting value corresponding to the backlight as the operating current value corresponding to the backlight.

Alternatively, in some possible implementations of the present application, acquiring the expected current value corresponding to the backlight includes:

acquiring target backlight data of the screen and display data of the current displayed image, where the display data includes a maximum brightness setting value of the backlight, a minimum current setting value corresponding to the backlight, and a current brightness array of the backlight corresponding to the current displayed image, where the current brightness array includes a plurality of current brightness data;

acquiring an average brightness value of the backlight corresponding to the current displayed image according to the current brightness array of the backlight; and acquiring the expected current value corresponding to the backlight according to the minimum current setting value, the target backlight data, the maximum brightness setting value, and the average brightness value.

Alternatively, in some possible implementations of the present application, determining the target brightness array of the backlight according to the operating current value, the maximum overdrive current setting value corresponding to the backlight, and the current brightness array of the backlight corresponding to the current displayed image on the screen includes:

determining a target ratio coefficient according to the operating current value and the maximum overdrive current setting value; and determining the target brightness array of the backlight according to the target ratio coefficient and the current brightness array.

In a second aspect, an embodiment of the present application further provides an image adjustment device, including:

an acquisition module configured to acquire a maximum current setting value and an expected current value corresponding to a backlight;

a first determination module configured to determine an operating current value corresponding to the backlight according to the maximum current setting value and the expected current value;

a second determination module configured to determine a target brightness array of the backlight according to the operating current value, a maximum overdrive current setting value corresponding to the backlight, and a current brightness array of the backlight corresponding to a current displayed image on a screen, where the target brightness array includes a plurality of target brightness data; and an adjustment module configured to control a brightness of the backlight according to the plurality of target brightness data in the target brightness array to adjust an image displayed on the screen.

In a third aspect, an embodiment of the present application provides an electronic device. The electronic device includes a memory and a processor, the memory stores a computer program, and the processor is configured to run the computer program in the memory to perform the above-mentioned image adjustment method.

In a fourth aspect, an embodiment of the present application provides a computer-readable storage medium, storing a computer program therein. The computer program is executed by a processor to perform the above-mentioned image adjustment method.

Beneficial Effects

The embodiments of the present application provide the image adjustment method, the device, the electronic device, and the computer-readable storage medium. In the method, the maximum current setting value and the expected current value corresponding to the backlight are first acquired. Then, the operating current value corresponding to the backlight is determined according to the maximum current setting value and the expected current value. The target brightness array of the backlight is determined according to the operating current value, the maximum overdrive current setting value corresponding to the backlight, and the current brightness array of the backlight corresponding to the current displayed image on the screen. Finally, the brightness of the backlight is controlled according to a plurality of target brightness arrays in the target brightness array to adjust the image displayed on the screen. Since the image adjustment method provided by the present application determines the operating current value based on a relationship of size between the maximum current setting value and the expected current value, the backlight is prevented from working at an excessively high current for a long time, which causes damage to the hardware, thereby improving a display lifespan of the screen.

BRIEF DESCRIPTION OF THE DRAWINGS

In order to more clearly illustrate technical solutions in the embodiments of the present application, the following drawings that will be described in the embodiments are briefly introduced. It is obvious that the drawings described below are merely some embodiments of the present application, those skilled in the art can obtain other drawings according to these drawings without creative efforts.

DETAILED DESCRIPTION OF THE PREFERRED EMBODIMENTS

The technical solutions in the embodiments of the present disclosure will be clearly and completely described below with reference to the accompanying drawings in the embodiments of the present disclosure. However, the described embodiments are only some, but not all, embodiments of the present disclosure. Based on the embodiments in the present disclosure, all other embodiments obtained by those skilled in the art without creative efforts shall fall within the protection scope of the present disclosure.

The embodiments of the present application provide an image adjustment method, a device, an electronic device, and a computer-readable storage medium. The image adjustment device can be integrated in an electronic device. The electronic device can be a server or a terminal. The terminal can include a tablet, a notebook computer, a personal computer (PC), a microprocessor box, or other devices.

Terms "including" and "having" and any other variants thereof in the specification, claims, and drawings of the present application are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device. In addition, terms "first", "second", "third", "fourth", and so on are intended to distinguish between different objects but do not indicate a particular order.

In this application, local dimming refers to adjusting a display of an image by adjusting a brightness of a backlight. Since the backlight of a display panel is composed of hundreds of LEDs, the backlight LED can be adjusted according to a brightness of the image. The brightness of the backlight corresponding to a highlighted part of the image on a display screen reaches the maximum, and the brightness of the backlight corresponding to a dark part can be adjusted to the minimum. This method of adjusting the displayed image by adjusting the brightness of the backlight reduces a power consumption of the display screen while improving the image display performance.

In the present application, a maximum brightness setting value of the backlight, a minimum current setting value, a maximum current setting value, a maximum overdrive current setting value, etc. corresponding to the backlight are all setting values related to the display performance of the display screen.

In the present application, target backlight data refers to backlight data corresponding to the display performance that the user expects the display screen to achieve.

Figure 1:
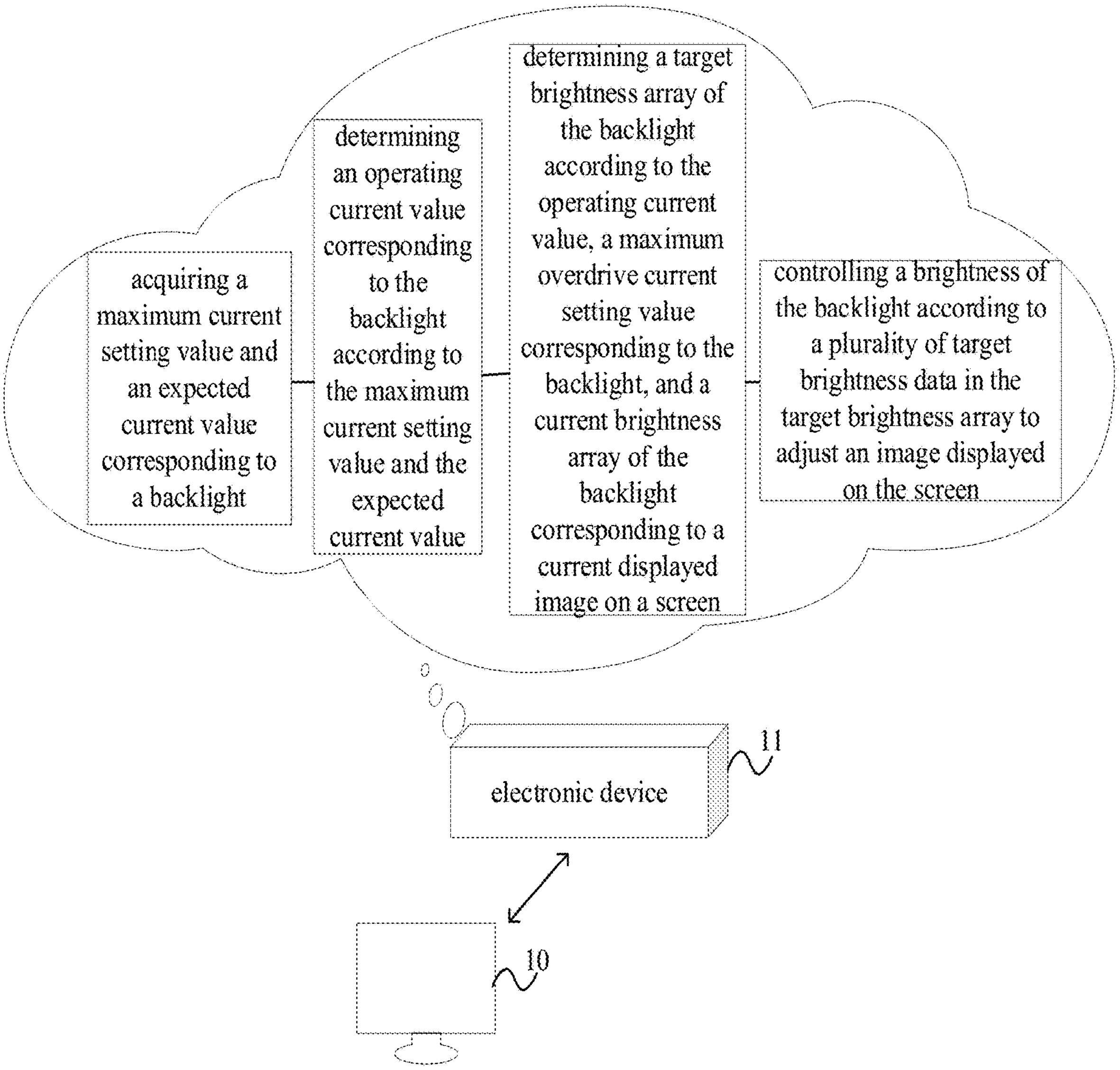
FIG. 1 is a schematic diagram of a first scenario of an image adjustment system in an embodiment of the present application.

Referring to FIG. 1, which is a schematic diagram of a first scenario of an image adjustment system in an embodiment of the present application. Taking the image adjustment device integrated in an electronic device as an example, first, the electronic device 11 acquires a maximum current setting value and an expected current value corresponding to a backlight. Then, according to the maximum current setting value and the expected current value, an operating current value of the backlight is determined. According to the operating current value, a maximum overdrive current setting value, and a current brightness array, a target brightness array of the backlight is determined. Finally, the electronic device 11 controls a brightness of the backlight according to a target brightness value to adjust an image displayed on a screen 10. Since the image adjustment method provided by the present application determines the operating current value according to a relationship of size between the maximum current setting value and the expected current value, the backlight is prevented from working at an excessively high current for a long time, which causes damage to the hardware, thereby improving a display lifespan of the screen.

It should be noted that the scene diagram of the image adjustment system shown in FIG. 1 is only an example. The electronic device and the screen described in the embodiments of the present application are intended to more clearly illustrate the technical solutions of the embodiments of the present application, and do not constitute a limitation on the technical solutions provided by the embodiments of the present application. A person of ordinary skill in the art will appreciate that with the evolution of the system and the emergence of new business scenarios, the technical solutions provided by the embodiments of the present application are also applicable to similar technical problems. The following is a detailed description of each. It should be noted that the description order of the following embodiments is not intended to limit the preferred order of the embodiments.

Figure 2:
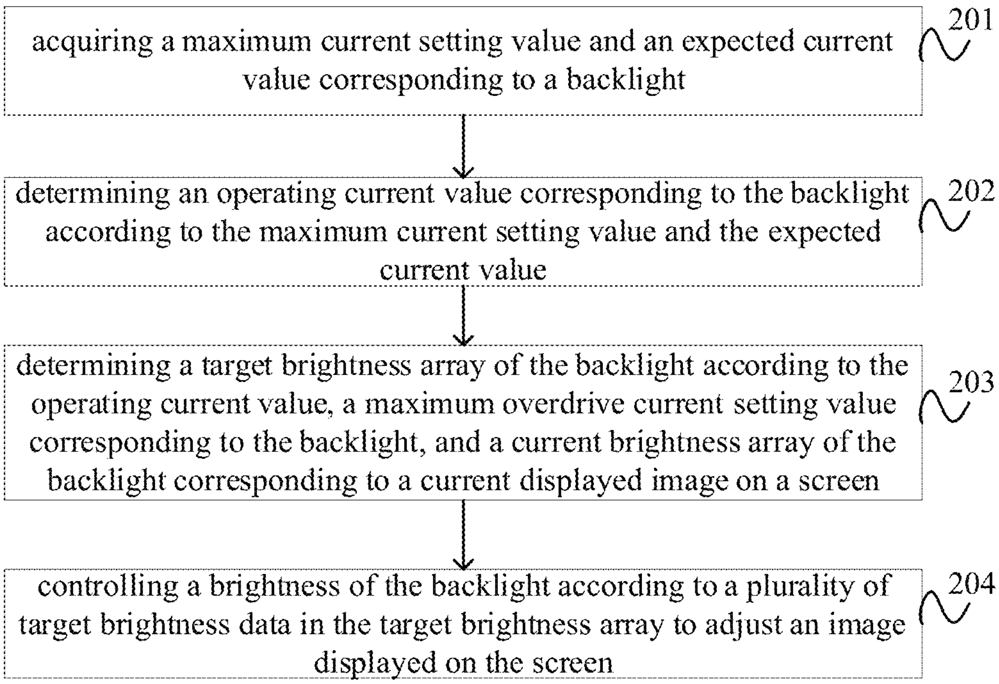
FIG. 2 is a first flowchart of an image adjustment method in an embodiment of the present application.

Referring to FIG. 2, which is a first flowchart of an image adjustment method in an embodiment of the present application, which is used in the above-mentioned electronic device, including:

Step 201, a maximum current setting value and an expected current value corresponding to a backlight are acquired.

In the present application, the maximum current setting value corresponding to the backlight is a setting value related to the performance of the backlight in the display panel, which can be considered as a fixed value. The expected current value is a current value corresponding to a display effect that the user expects the display screen to achieve. The expected current value can be calculated by other methods. The electronic device can directly acquire the calculated expected current value, or it can be acquired by the electronic device through calculation. The specific method of acquiring the expected current value is not limited here.

In one embodiment, the step of acquiring the expected current value corresponding to backlight includes: acquiring target backlight data of the screen and display data of a current displayed image. The display data includes a maximum brightness setting value of the backlight, a minimum current setting value corresponding to the backlight, and a current brightness array of the backlight corresponding to the current displayed image. The current brightness array includes a plurality of current brightness data. Based on the current brightness array of the backlight, an average brightness value of the backlight corresponding to the current displayed image is acquired. Based on the minimum current setting value, the target backlight data, the maximum brightness setting value, and the average brightness value, the expected current value corresponding to the backlight is acquired.

The target backlight data of the screen can be expected backlight data input by the user in the display screen, or it can be the backlight data originally set by the display screen. The specific target backlight data is not limited here. The user can determine the expected target backlight data by dragging a brightness adjustment bar on the screen, or directly input the expected target backlight data in an input box. The specific method of inputting the target backlight data is not limited here.

The display data includes the maximum brightness setting value of the backlight, the minimum current setting value, the maximum current setting value, a maximum overdrive current setting value corresponding to the backlight, and the current brightness array of the backlight corresponding to the current displayed image. The current brightness array includes a plurality of current brightness data. The maximum brightness setting value of the backlight, the minimum current setting value, the maximum current setting value, and the maximum overdrive current setting value corresponding to the backlight are all original data set in the display screen. The determination of the original data is related to the performance of the display screen and can be considered as the original fixed value here. The current brightness array of the backlight corresponding to the current displayed image is related to the current displayed image. Different current displayed images correspond to different backlight brightness data.

Step 202, an operating current value corresponding to the backlight is determined according to the maximum current setting value and the expected current value.

The maximum current setting value is related to the performance of the display screen. Under normal circumstances, a maximum value of a current value passed into the backlight is the maximum current setting value. The current value within the maximum current setting value can make the display performance of the screen better. Therefore, it is necessary to compare the expected current value with the maximum current setting value. The expected current that exceeds the maximum current setting value is called an over-driving current, or overdrive current for short. Under normal circumstances, the expected current can be greater than the maximum current setting value, but cannot be the maximum overdrive current setting value. The maximum overdrive current setting value is the maximum current value at which the hardware of the display screen can operate normally. If the maximum drive current setting value is exceeded, the hardware of the display screen may be damaged. Therefore, it is necessary to determine the actual operating current value allowed to be input by the backlight based on the maximum current setting value and the expected current value.

Figure 3:
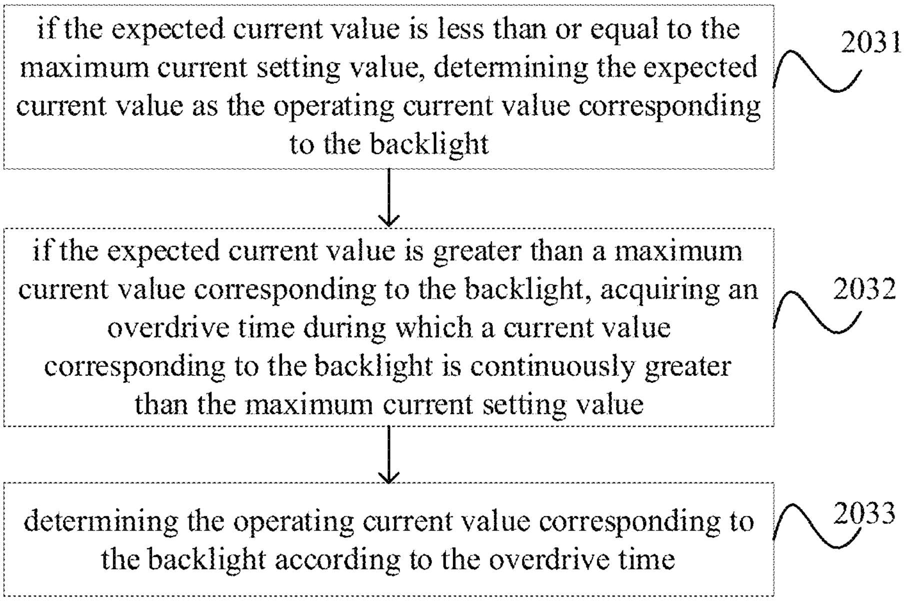
FIG. 3 is a second flowchart of an image adjustment method in an embodiment of the present application.

FIG. 3 is a second flowchart of an image adjustment method in an embodiment of the present application, where the step 202 further includes the following steps:

2031, if the expected current value is less than or equal to the maximum current setting value, the expected current value is determined as the operating current value corresponding to the backlight.

The expected current value is less than or equal to the maximum current value, and the hardware of the display screen will not be damaged due to excessive current. Therefore, the expected current value is determined as the operating current value corresponding to the backlight.

2032, if the expected current value is greater than the maximum current value corresponding to the backlight, an overdrive time during which a current value corresponding to the backlight is continuously greater than the maximum current setting value is acquired.

If the expected current value is greater than the maximum current setting value corresponding to the backlight, in actual situations, the operating current value can be greater than the maximum current setting value, but must be less than the maximum drive current setting value. Moreover, the time when the current is greater than the maximum current setting value cannot exceed a first preset time threshold. That is, to protect the hardware in the display screen, the backlight in the display screen cannot operate under excessively high current for a long time. Therefore, the first preset time threshold is set to protect the hardware in the display screen.

Step 2033, the operating current value corresponding to the backlight is determined according to the overdrive time.

In one embodiment, the step of determining the operating current value corresponding to the backlight according to the overdrive time includes: if the overdrive time is equal to a first preset time threshold, determining the maximum current setting value as the operating current value of the backlight; if the overdrive time is greater than the first preset time threshold, acquiring a second preset time threshold, where the second preset time threshold is greater than the first preset time threshold; determining the operating current value corresponding to the backlight according to the second preset time threshold; if the overdrive time is less than the first preset time threshold, acquiring a number of times overdrive during which the current value corresponding to the backlight is greater than the maximum current setting value within a preset time period; and determining the operating current value corresponding to the backlight according to the number of times overdrive.

If the overdrive time is equal to the first preset time threshold, it means that the current corresponding to the backlight cannot continue to increase. Therefore, the maximum current setting value can only be determined as the operating current corresponding to the backlight. If the overdrive time is less than the first preset time threshold, it is also necessary to ensure that the backlight is not overdriven frequently. That is, if the number of times overdrive is greater than or equal to the preset number of times overdrive, the maximum current setting value corresponding to the backlight is determined as the operating current value corresponding to the backlight. If the number of times overdrive is less than the preset number of times overdrive, the maximum overdrive current setting value corresponding to the backlight is determined as the operating current value corresponding to the backlight.

The current corresponding to the backlight can continue to increase. However, after the overdrive time corresponding to the current corresponding to the backlight is equal to the first preset time threshold, the current corresponding to the backlight needs to be reduced to the maximum current setting value and maintained for a period of time to ensure that the hardware corresponding to the display screen dissipates heat in time. After the current decreases for a period of time, the current of the backlight can be allowed to continue to increase to the maximum drive current setting value. That is, if the overdrive time is greater than or equal to the second preset time threshold, the maximum overdrive current setting value is determined as the operating current value corresponding to the backlight. If the overdrive time is less than the second preset time threshold, the maximum current setting value is determined as the operating current value of the backlight. The second preset time threshold is equal to the first preset time threshold plus a heat dissipation time.

Step 203, a target brightness array of the backlight is determined according to the operating current value, the maximum overdrive current setting value corresponding to the backlight, and the current brightness array of the backlight corresponding to the current displayed image on the screen.

In one embodiment, the step of determining the target brightness array of the backlight according to the operating current value, the maximum overdrive current setting value corresponding to the backlight, and the current brightness array of the backlight corresponding to the current displayed image on the screen includes: determining a target ratio coefficient according to the operating current value and the maximum overdrive current setting value; and determining the target brightness array of the backlight according to the target ratio coefficient and the current brightness array.

The following content is used as an example to explain the step 203. First, the target ratio coefficient is determined according to the operating current value and the maximum overdrive current setting value. That is, a ratio coefficient k=operating current value/maximum overdrive current setting value. Then, the target brightness array of the backlight is determined according to the target ratio coefficient and the current brightness array, and the target brightness array=k*current brightness array.

Step 204, a brightness of the backlight is controlled according to a plurality of target brightness data in the target brightness array to adjust an image displayed on the screen.

The electronic device controls the brightness of the backlight according to the target brightness data, thereby adjusting the image displayed on the screen. The target brightness data in the target brightness array corresponds to each backlight in the backlight panel.

The embodiments of the present application provide the image adjustment method. In the method, the maximum current setting value and the expected current value corresponding to the backlight are first acquired. Then, the operating current value corresponding to the backlight is determined according to the maximum current setting value and the expected current value. The target brightness array of the backlight is determined according to the operating current value, the maximum overdrive current setting value corresponding to the backlight, and the current brightness array of the backlight corresponding to the current displayed image on the screen. Finally, the brightness of the backlight is controlled according to the plurality of target brightness arrays in the target brightness array to adjust the image displayed on the screen. Since the image adjustment method provided by the present application determines the operating current value based on a relationship of size between the maximum current setting value and the expected current value, the backlight is prevented from working at an excessively high current for a long time, which causes damage to the hardware, thereby improving a display lifespan of the screen.

Figure 4:
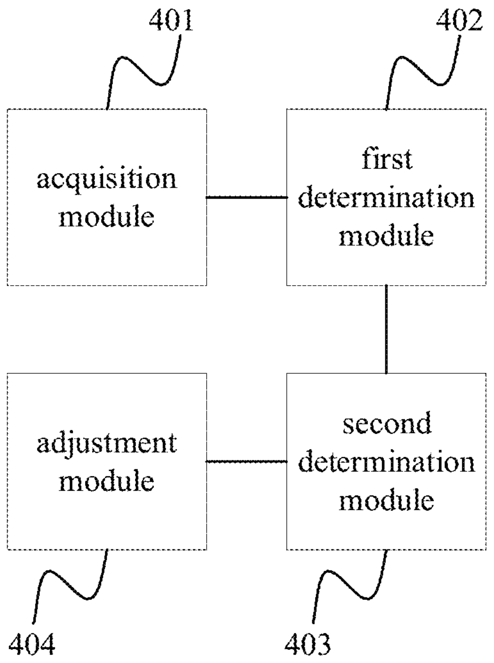
FIG. 4 is a schematic diagram of an image adjustment device in an embodiment of the present application.

Based on the above-mentioned embodiment method, an embodiment will be further described from a perspective of an image adjustment device. Refer to FIG. 4, which specifically describes a schematic diagram of an image adjustment device in an embodiment of the present application, including the following.

An acquisition module 401 is configured to acquire a maximum current setting value and an expected current value corresponding to a backlight.

In one embodiment, the acquisition module 401 further includes the following.

A first acquisition submodule is configured to acquire target backlight data of the screen and display data of the current displayed image. The display data includes a maximum brightness setting value of the backlight, a minimum current setting value corresponding to the backlight, and a current brightness array of the backlight corresponding to the current displayed image. The current brightness array includes a plurality of current brightness data.

A first determination submodule is configured to acquire an average brightness value of the backlight corresponding to the current displayed image according to the current brightness array of the backlight.

A second determination submodule is configured to acquire the expected current value corresponding to the backlight according to the minimum current setting value, the target backlight data, the maximum brightness setting value, and the average brightness value.

A first determination module 402 is configured to determine an operating current value corresponding to the backlight according to the maximum current setting value and the expected current value.

In one embodiment, the first determination module 402 includes the following.

A third determination submodule is configured to determine the expected current value as the operating current value corresponding to the backlight if the expected current value is less than or equal to the maximum current setting value.

A second acquisition submodule is configured to acquire an overdrive time during which a current value corresponding to the backlight is continuously greater than the maximum current setting value if the expected current value is greater than a maximum current value corresponding to the backlight.

A fourth determination submodule is configured to determine the operating current value corresponding to the backlight according to the overdrive time.

A second determination module 403 is configured to determine a target brightness array of the backlight according to the operating current value, a maximum overdrive current setting value corresponding to the backlight, and a current brightness array of the backlight corresponding to a current displayed image on a screen. The target brightness array includes a plurality of target brightness data.

In one embodiment, the second determination module 403 includes the following.

A fifth determination submodule is configured to determine a target ratio coefficient according to the operating current value and the maximum overdrive current setting value.

A sixth determination submodule is configured to determine the target brightness array of the backlight according to the target ratio coefficient and the current brightness array.

An adjustment module 404 is configured to control a brightness of the backlight according to the plurality of target brightness data in the target brightness array to adjust an image displayed on the screen.

Figure 5:
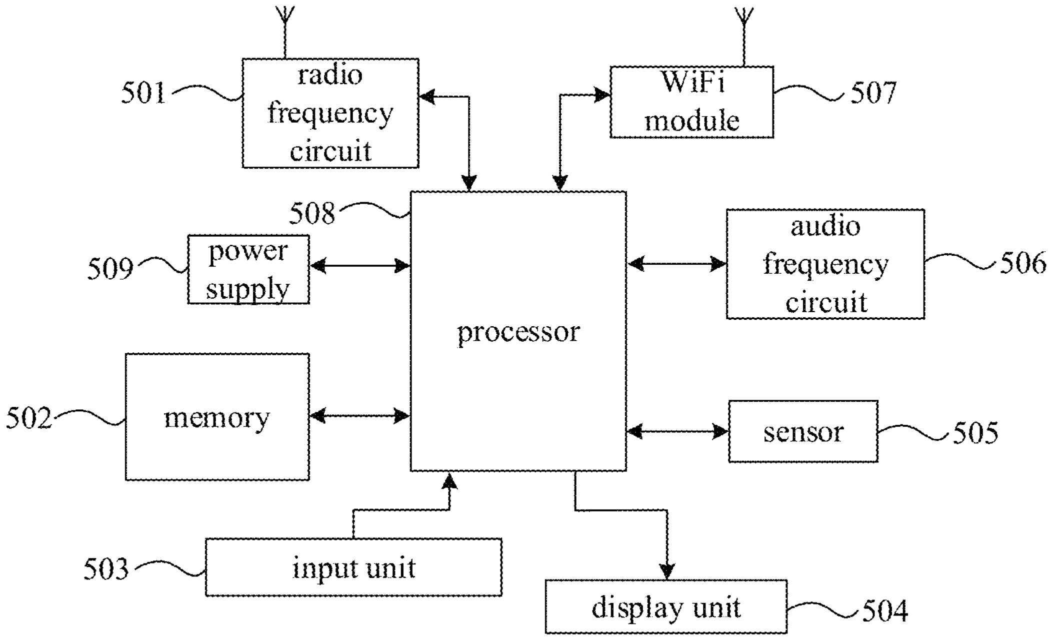
FIG. 5 is a schematic diagram of an electronic device in an embodiment of the present application.

Accordingly, an embodiment of the present application further provides an electronic device, as shown in FIG. 5, the electronic device may include a radio frequency circuit 501, a memory 502 which may include one or more computer-readable storage mediums, an input unit 503, a display unit 504, a sensor 505, an audio frequency circuit 506, a WiFi module 507, a processor 508 which may include one or more processing cores, and a power supply 509, etc. A person skilled in the art recognizes that the electronic device is not limited to its structure shown in FIG. 5, it may include more or fewer components than those shown in the figure, or some components may be combined, or a different component deployment may be used.

The radio frequency circuit 501 may be configured to receive and send a signal in an information receiving and sending process or in a call process. Particularly, after receiving downlink information from a base station, the radio frequency circuit 501 sends the downlink information to one or more processors 508 for processing. In addition, the radio frequency circuit 501 sends uplink data to the base station. The memory 502 may be configured to store a software program and a module. The processor 508 runs the software program and the module that are stored in the memory 502, to execute various functions and perform data processing. The input unit 503 may be configured to: receive an entered digit or entered character information, so as to generate a keyboard, mouse, joystick, optical or track ball signal input related to the user setting and function control.

The display unit 504 may be configured to display information input by the user or information provided for the user, and various graphic user interfaces of the electronic device, and the graphic user interfaces may be formed by using a graph, a text, an icon, a video, and any combination thereof.

The electronic device may further include at least one sensor 505, such as an optical sensor, a motion sensor, and other sensors. The audio frequency circuit 506 includes a speaker, which can provide an audio interface between a user and the electronic device.

WiFi is a short-range wireless transmission technology. The electronic device may help, by using the WiFi module 507, the user to receive and send emails, browse a webpage, access stream media, and so on, which provides wireless broadband Internet access for the user. Although FIG. 5 shows the WiFi module 507, it may be understood that the WiFi module is not a necessary component of the electronic device, and when required, the WiFi module may be omitted as long as the scope of the essence of the present disclosure is not changed.

The processor 508 is the control center of the electronic device, and is connected to various parts of the mobile phone by using various interfaces and lines. By running or executing the software program and/or module stored in the memory 502, and invoking data stored in the memory 502, the processor 508 performs various functions and processing data of the electronic device, thereby performing overall monitoring on the mobile phone.

The electronic device may further include a power supply 509 (for example, a battery) for supplying power to the components. Preferably, the power supply may be logically connected to the processor 508 by using a power management system, thereby implementing functions such as charging, discharging, and power consumption management by using the power management system.

Although not shown in the figure, the electronic device may further include a camera, a Bluetooth module, and the like, which are not further described herein. Specifically, in the present embodiments, the processor 508 in the electronic device will load the executable files corresponding to the processes of one or more application programs into the memory 502 according to the following instructions, and the processor 508 will run the application programs stored in the memory 502, thereby implementing the following functions:

acquiring a maximum current setting value and an expected current value corresponding to a backlight;

determining an operating current value corresponding to the backlight according to the maximum current setting value and the expected current value;

determining a target brightness array of the backlight according to the operating current value, a maximum overdrive current setting value corresponding to the backlight, and a current brightness array of the backlight corresponding to a current displayed image on a screen, where the target brightness array comprises a plurality of target brightness data; and controlling a brightness of the backlight according to the plurality of target brightness data in the target brightness array to adjust an image displayed on the screen.

In the above embodiments, the description of each embodiment has its own emphasis. For the part that is not described in detail in a certain embodiment, please refer to the detailed description above and will not be repeated here.

A person of ordinary skill in the art will appreciate that all or part of the steps in the various methods of the above-described embodiments may be accomplished by instructions, or by controlling related hardware through instructions. The instructions may be stored in a computer-readable storage medium and loaded and executed by a processor.

To this end, an embodiment of the present application provides a storage medium in which a plurality of instructions are stored. The instructions can be loaded by a processor to implement the following functions:

acquiring a maximum current setting value and an expected current value corresponding to a backlight;

determining an operating current value corresponding to the backlight according to the maximum current setting value and the expected current value;

determining a target brightness array of the backlight according to the operating current value, a maximum overdrive current setting value corresponding to the backlight, and a current brightness array of the backlight corresponding to a current displayed image on a screen, where the target brightness array comprises a plurality of target brightness data; and controlling a brightness of the backlight according to the plurality of target brightness data in the target brightness array to adjust an image displayed on the screen.

The specific implementation of each of the above operations can be found in the previous embodiments, which will not be repeated here.

The storage medium may include: a read-only memory (ROM), a random access memory (RAM), a disk, or an optical disk, etc.

Since the steps of any image adjustment method provided in the embodiments of the present application can be executed through the instructions stored in the storage medium, the beneficial effects that can be achieved by any image adjustment method provided in the embodiments of the present application can be achieved. Please refer to the previous embodiments for details and will not be repeated here.

The image adjustment method, the device, the electronic device, and the computer-readable storage medium provided by the embodiments of the present disclosure are described above in detail. The principles and implementations of the present disclosure are described in this specification by using specific examples, and the descriptions of the above embodiments are only used to help understand the method and the core idea of the present disclosure. Those skilled in the art should understand that the technical solutions described in the aforementioned embodiments may still be modified, or some of the technical features therein may be replaced by equivalents. These modifications or replacements do not cause the essence of the corresponding technical solutions to deviate from the scope of the technical solutions of the embodiments of the present application.

What is claimed is:

1. An image adjustment method, comprising:

acquiring a maximum current setting value and an expected current value corresponding to a backlight;

determining an operating current value corresponding to the backlight according to the maximum current setting value and the expected current value;

determining a target brightness array of the backlight according to the operating current value, a maximum overdrive current setting value corresponding to the backlight, and a current brightness array of the backlight corresponding to a current displayed image on a screen, wherein the target brightness array comprises a plurality of target brightness data; and controlling a brightness of the backlight according to the plurality of target brightness data in the target brightness array to adjust an image displayed on the screen;

wherein determining an operating current value corresponding to the backlight according to the maximum current setting value and the expected current value comprises:

if the expected current value is less than or equal to the maximum current setting value, determining the expected current value as the operating current value corresponding to the backlight;

if the expected current value is greater than a maximum current value corresponding to the backlight, acquiring an overdrive time during which a current value corresponding to the backlight is continuously greater than the maximum current setting value; and determining the operating current value corresponding to the backlight according to the overdrive time;

wherein determining the operating current value corresponding to the backlight according to the overdrive time comprises:

if the overdrive time is equal to a first preset time threshold, determining the maximum current setting value as the operating current value of the backlight;

if the overdrive time is greater than the first preset time threshold, acquiring a second preset time threshold, wherein the second preset time threshold is greater than the first preset time threshold;

determining the operating current value corresponding to the backlight according to the second preset time threshold;

if the overdrive time is less than the first preset time threshold, acquiring a number of times overdrive during which the current value corresponding to the backlight is greater than the maximum current setting value within a preset time period; and determining the operating current value corresponding to the backlight according to the number of times overdrive.

2. The image adjustment method according to claim 1, wherein determining the operating current value corresponding to the backlight according to the second preset time threshold comprises:

if the overdrive time is greater than or equal to the second preset time threshold, determining the maximum overdrive current setting value as the operating current value corresponding to the backlight; and if the overdrive time is less than the second preset time threshold, determining the maximum current setting value as the operating current value of the backlight.

3. The image adjustment method according to claim 1, wherein determining the operating current value corresponding to the backlight according to the number of times overdrive comprises:

if the number of times overdrive is greater than or equal to a preset number of times overdrive, determining the maximum current setting value corresponding to the backlight as the operating current value corresponding to the backlight; and if the number of times overdrive is less than the preset number of times overdrive, determining the maximum overdrive current setting value corresponding to the backlight as the operating current value corresponding to the backlight.

4. The image adjustment method according to claim 1, wherein acquiring the expected current value corresponding to the backlight comprises:

acquiring target backlight data of the screen and display data of the current displayed image, wherein the display data comprises a maximum brightness setting value of the backlight, a minimum current setting value corresponding to the backlight, and a current brightness array of the backlight corresponding to the current displayed image, wherein the current brightness array comprises a plurality of current brightness data;

acquiring an average brightness value of the backlight corresponding to the current displayed image according to the current brightness array of the backlight; and acquiring the expected current value corresponding to the backlight according to the minimum current setting value, the target backlight data, the maximum brightness setting value, and the average brightness value.

5. The image adjustment method according to claim 4, wherein acquiring the target backlight data of the screen comprises:

acquiring the target backlight data of the screen by dragging a brightness adjustment bar on the screen.

6. The image adjustment method according to claim 4, wherein acquiring the target backlight data of the screen comprises:

acquiring the target backlight data of the screen by inputting the target backlight data in an input box of the screen.

7. The image adjustment method according to claim 1, wherein determining the target brightness array of the backlight according to the operating current value, the maximum overdrive current setting value corresponding to the backlight, and the current brightness array of the backlight corresponding to the current displayed image on the screen comprises:

determining a target ratio coefficient according to the operating current value and the maximum overdrive current setting value; and determining the target brightness array of the backlight according to the target ratio coefficient and the current brightness array.

8. An image adjustment method, comprising:

an acquisition module configured to acquire a maximum current setting value and an expected current value corresponding to a backlight;

a first determination module configured to determine an operating current value corresponding to the backlight according to the maximum current setting value and the expected current value;

a second determination module configured to determine a target brightness array of the backlight according to the operating current value, a maximum overdrive current setting value corresponding to the backlight, and a current brightness array of the backlight corresponding to a current displayed image on a screen, wherein the target brightness array comprises a plurality of target brightness data; and an adjustment module configured to control a brightness of the backlight according to the plurality of target brightness data in the target brightness array to adjust an image displayed on the screen;

wherein the second determination module is configured to:

determine a target ratio coefficient according to the operating current value and the maximum overdrive current setting value; and determine the target brightness array of the backlight according to the target ratio coefficient and the current brightness array.

9. The image adjustment device according to claim 8, wherein the second determination module is configured to:

if the expected current value is less than or equal to the maximum current setting value, determine the expected current value as the operating current value corresponding to the backlight;

if the expected current value is greater than a maximum current value corresponding to the backlight, acquire an overdrive time during which a current value corresponding to the backlight is continuously greater than the maximum current setting value; and determine the operating current value corresponding to the backlight according to the overdrive time.

10. The image adjustment device according to claim 9, wherein the second determination module is configured to:

if the overdrive time is equal to a first preset time threshold, determine the maximum current setting value as the operating current value of the backlight;

if the overdrive time is greater than the first preset time threshold, acquire a second preset time threshold, wherein the second preset time threshold is greater than the first preset time threshold;

determine the operating current value corresponding to the backlight according to the second preset time threshold;

if the overdrive time is less than the first preset time threshold, acquire a number of times overdrive during which the current value corresponding to the backlight is greater than the maximum current setting value within a preset time period; and determine the operating current value corresponding to the backlight according to the number of times overdrive.

11. The image adjustment device according to claim 10, wherein the second determination module is configured to:

if the overdrive time is greater than or equal to the second preset time threshold, determine the maximum overdrive current setting value as the operating current value corresponding to the backlight; and if the overdrive time is less than the second preset time threshold, determine the maximum current setting value as the operating current value of the backlight.

12. The image adjustment device according to claim 10, wherein the second determination module is configured to:

if the number of times overdrive is greater than or equal to a preset number of times overdrive, determine the maximum current setting value corresponding to the backlight as the operating current value corresponding to the backlight; and if the number of times overdrive is less than the preset number of times overdrive, determine the maximum overdrive current setting value corresponding to the backlight as the operating current value corresponding to the backlight.

13. The image adjustment device according to claim 8, wherein the acquisition module is configured to:

acquire target backlight data of the screen and display data of the current displayed image, wherein the display data comprises a maximum brightness setting value of the backlight, a minimum current setting value corresponding to the backlight, and a current brightness array of the backlight corresponding to the current displayed image, wherein the current brightness array comprises a plurality of current brightness data;

acquire an average brightness value of the backlight corresponding to the current displayed image according to the current brightness array of the backlight; and acquire the expected current value corresponding to the backlight according to the minimum current setting value, the target backlight data, the maximum brightness setting value, and the average brightness value.

14. The image adjustment device according to claim 13, wherein the acquisition module is configured to:

acquire the target backlight data of the screen by dragging a brightness adjustment bar on the screen.

15. The image adjustment device according to claim 13, wherein the acquisition module is configured to:

acquire the target backlight data of the screen by inputting the target backlight data in an input box of the screen.

16. An electronic device, comprising a memory and a processor, the memory storing a computer program, and the processor being configured to run the computer program in the memory to perform:

acquiring a maximum current setting value and an expected current value corresponding to a backlight;

determining an operating current value corresponding to the backlight according to the maximum current setting value and the expected current value;

determining a target brightness array of the backlight according to the operating current value, a maximum overdrive current setting value corresponding to the backlight, and a current brightness array of the backlight corresponding to a current displayed image on a screen, wherein the target brightness array comprises a plurality of target brightness data; and controlling a brightness of the backlight according to the plurality of target brightness data in the target brightness array to adjust an image displayed on the screen;

acquiring target backlight data of the screen and display data of the current displayed image, wherein the display data comprises a maximum brightness setting value of the backlight, a minimum current setting value corresponding to the backlight, and a current brightness array of the backlight corresponding to the current displayed image, wherein the current brightness array comprises a plurality of current brightness data;

acquiring an average brightness value of the backlight corresponding to the current displayed image according to the current brightness array of the backlight; and acquiring the expected current value corresponding to the backlight according to the minimum current setting value, the target backlight data, the maximum brightness setting value, and the average brightness value.

17. The electronic device according to claim 16, wherein the processor further performs:

if the expected current value is less than or equal to the maximum current setting value, determining the expected current value as the operating current value corresponding to the backlight;

if the expected current value is greater than a maximum current value corresponding to the backlight, acquiring an overdrive time during which a current value corresponding to the backlight is continuously greater than the maximum current setting value; and determining the operating current value corresponding to the backlight according to the overdrive time.

18. The electronic device according to claim 16, wherein the processor is configured to acquire the target backlight data of the screen by dragging a brightness adjustment bar on the screen.

19. The electronic device according to claim 16, wherein the processor is configured to acquire the target backlight data of the screen by inputting the target backlight data in an input box of the screen.

20. The electronic device according to claim 16, wherein the processor further performs:

if the overdrive time is equal to a first preset time threshold, determining the maximum current setting value as the operating current value of the backlight;

if the overdrive time is greater than the first preset time threshold, acquiring a second preset time threshold, wherein the second preset time threshold is greater than the first preset time threshold;

determining the operating current value corresponding to the backlight according to the second preset time threshold;

if the overdrive time is less than the first preset time threshold, acquiring a number of times overdrive during which the current value corresponding to the backlight is greater than the maximum current setting value within a preset time period; and determining the operating current value corresponding to the backlight according to the number of times overdrive.

* * * * *